(12) United States Patent
Shyr

(10) Patent No.: US 6,873,523 B2
(45) Date of Patent: Mar. 29, 2005

(54) COMPUTER DEVICE USING SHIELDING DOOR FOR PROTECTING COMPONENTS IN THE DEVICE

(76) Inventor: Daniel Shyr, 235 Chung-Ho Box 8-24, Taipei (TW)

( * ) Notice: Subject to any disclaimer, the term of this patent is extended or adjusted under 35 U.S.C. 154(b) by 124 days.

(21) Appl. No.: 10/401,188

(22) Filed: Mar. 26, 2003

(65) Prior Publication Data

US 2003/0223191 A1 Dec. 4, 2003

(51) Int. Cl.[7] .................................................. G06F 1/16
(52) U.S. Cl. ..................... 361/683; 312/326; 312/223.2; 16/362
(58) Field of Search ................................ 361/679–687, 361/724–727; 312/223.1–223.6, 326, 329; 16/239, 357, 359, 362

(56) References Cited

U.S. PATENT DOCUMENTS 5,946,774 A * 9/1999 Ramsey et al. ............... 16/357
6,317,929 B1 * 11/2001 Ring .............................. 16/355
6,478,392 B2 * 11/2002 Gan et al. .................... 312/326

* cited by examiner

Primary Examiner—Hung Van Duong

(57) ABSTRACT

A computer device using a shielding door comprises a door; at least one post fixed to the door; at least one pivotal portion installed to the shielded surface and including at least one groove for receiving the post and thus the post can rotate in the groove. The groove includes a first receiving chamber and a second receiving chamber. The first receiving chamber receiving the post which has two shaft portions; and the second receiving chamber provides a space so that the other portion of the post can move therein. The first receiving chamber has two lateral walls. Each lateral wall has a respective hole so that the two shaft portions run across the two holes and positioned therein. An elastomer has a free end for confining the shaft portions. Thereby, the shaft portions will not leave from the holes and thus rotate therein steadily.

6 Claims, 6 Drawing Sheets

COMPUTER DEVICE USING SHIELDING DOOR FOR PROTECTING COMPONENTS IN THE DEVICE

FIELD OF THE INVENTION

The present invention relates to shielding doors of computers, and particularly to a computer device using a shielding door for protecting the components in the device.

BACKGROUND OF THE INVENTION

Referring to FIGS. 1 and 2, in general, a computer has a plurality of components, such as floppy disks, compact disks, etc. These devices have slots for being connected to power sources. Generally, a shielding door is used to protect these slots from undesired conductions so as to be damaged.

Referring to FIG. 1, the shielded surface 10 of a computer mainframe 1 has a concave portion. Two lateral sides of the concave portion are formed as walls 101. Each wall 101 has a shaft 102 for being pivotally connected to the pivotal rod 111 of an outer door 11. However, this pivotal structure is confined to a partial shielding section. Moreover, the structure is weak FIG. 2 shows another prior art for shielding a partial area of the computer. In this prior art, the shielded surface 20 of a computer mainframe 2 has a concave portion. Two lateral sides of the concave portion are formed as walls 201 and 202. The walls 201, 202 have holes 203 and 204 for being pivotally connected to the pivotal shafts 211 and 212 of an outer door 21. Since the two pivotal shafts 211 and 212 have fixed types, a predetermined position of the outer door 21 (near one pivotal shaft) is formed with a telescopic slit 213. Thereby, by this slit 213, the pivotal shaft 213 may be elastically inserted into the positioning hole 204. Therefore, the outer door can be opened easily. This pivotal structure of the outer door is only used to a partial area of the computer. Thereby, the door must be formed with a slit 213 so that the appearance becomes worse and thus it is not a preferred design.

SUMMARY OF THE INVENTION

Accordingly, the primary object of the present invention is to provide a computer device using a shielding door comprising: a door; at least one post fixed to the door; two axial ends of the post being protruded with respective shaft portions; the post facing to a shielded surface of the computer device; at least one pivotal portion capable of being pivotally engaged to the post; the pivotal portion being installed to the shielded surface; the pivotal portion including at least one groove for receiving the post and thus the post can rotate in the groove; the groove being smaller than the shielded surface and being positioned at one edge of the shielded surface; the groove having a predetermined width and extending to an adjacent lateral side of the shielded surface; the groove including a first receiving chamber and a second receiving chamber; the first receiving chamber being slightly larger than the second receiving chamber and the first receiving chamber being communicated to the second receiving chamber; the first receiving chamber receiving the post which has two shaft portions; the second receiving chamber provides a space so that other portion of the post can move therein; the first receiving chamber has two lateral walls which are adjacent to the two shaft portions and each lateral wall has a respective hole so that the two shaft portion run across the two holes and positioned therein.

The various objects and advantages of the present invention will be more readily understood from the following detailed description when read in conjunction with the appended drawing.

DETAILED DESCRIPTION OF THE PREFERRED EMBODIMENTS

Figure 1:
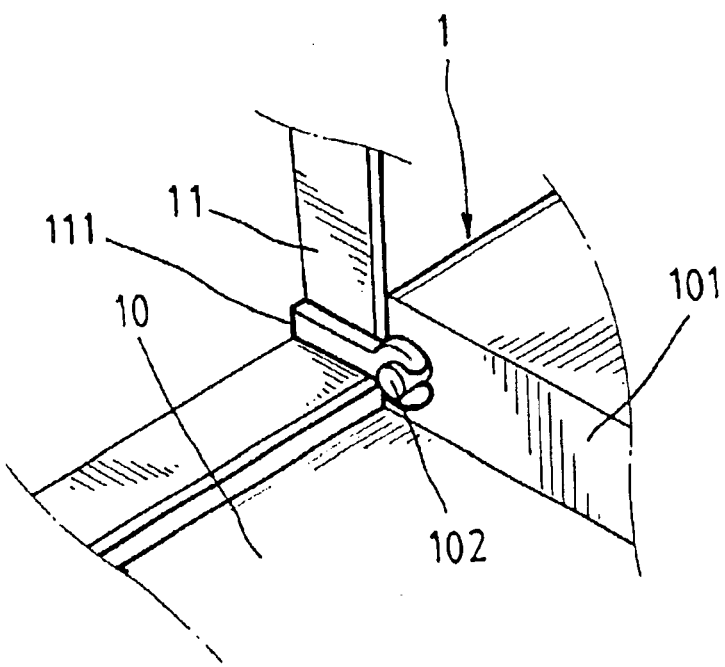
FIG. 1 shows the pivotal structure of a prior art shielding door.
Figure 2:
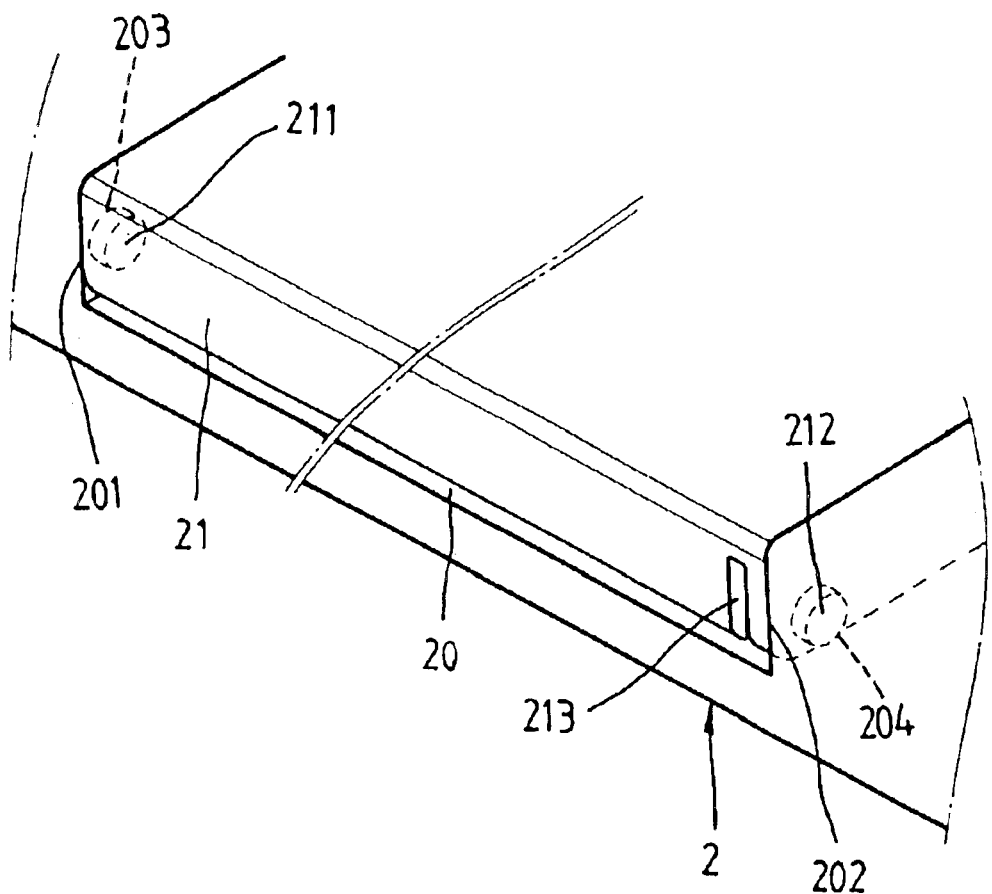
FIG. 2 shows the pivotal structure of another prior art shielding door.
Figure 3:
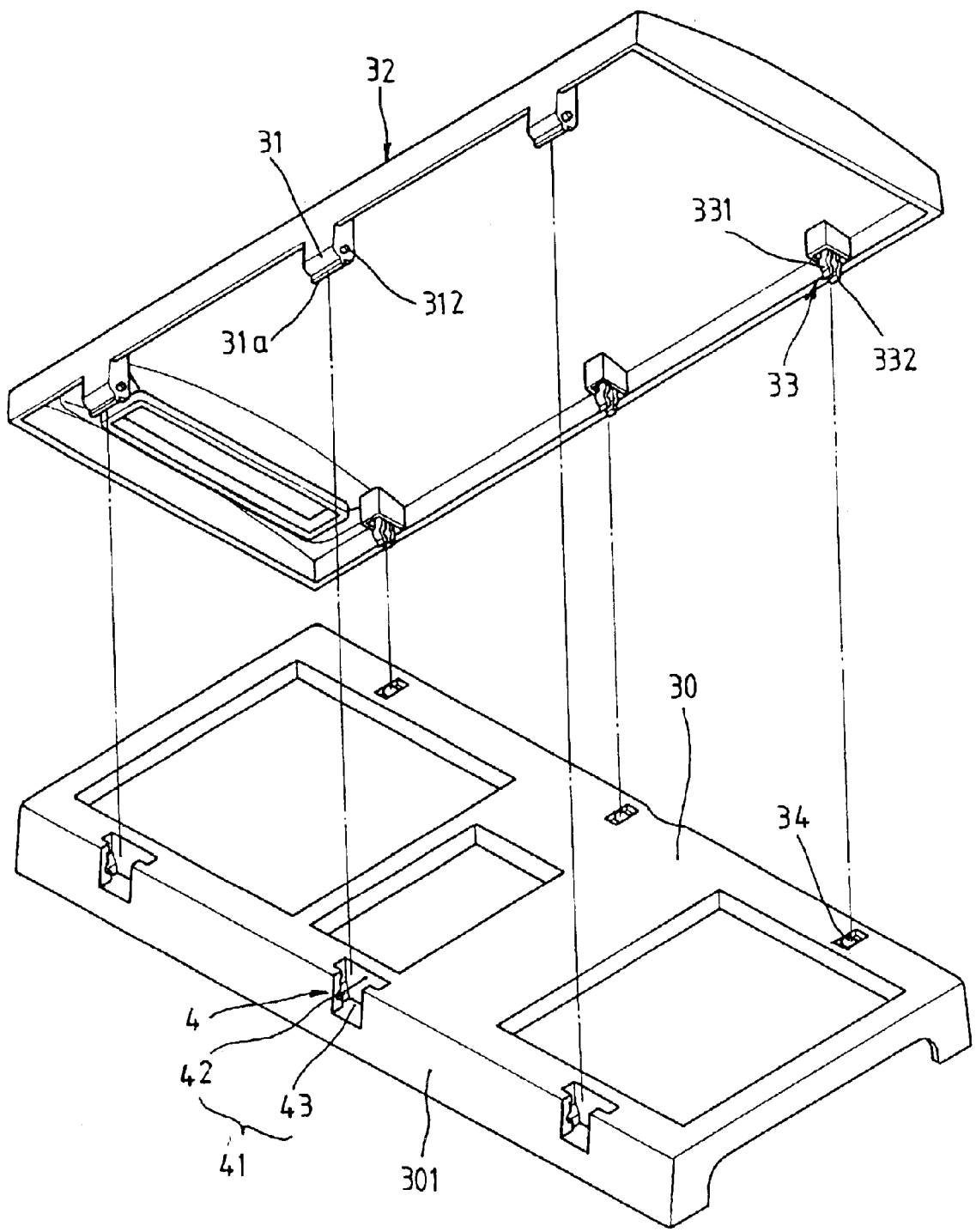
FIG. 3 is an exploded view of the computer device using a shielding door of the present invention, which has been pivotally connected to a computer device.
Figure 4:
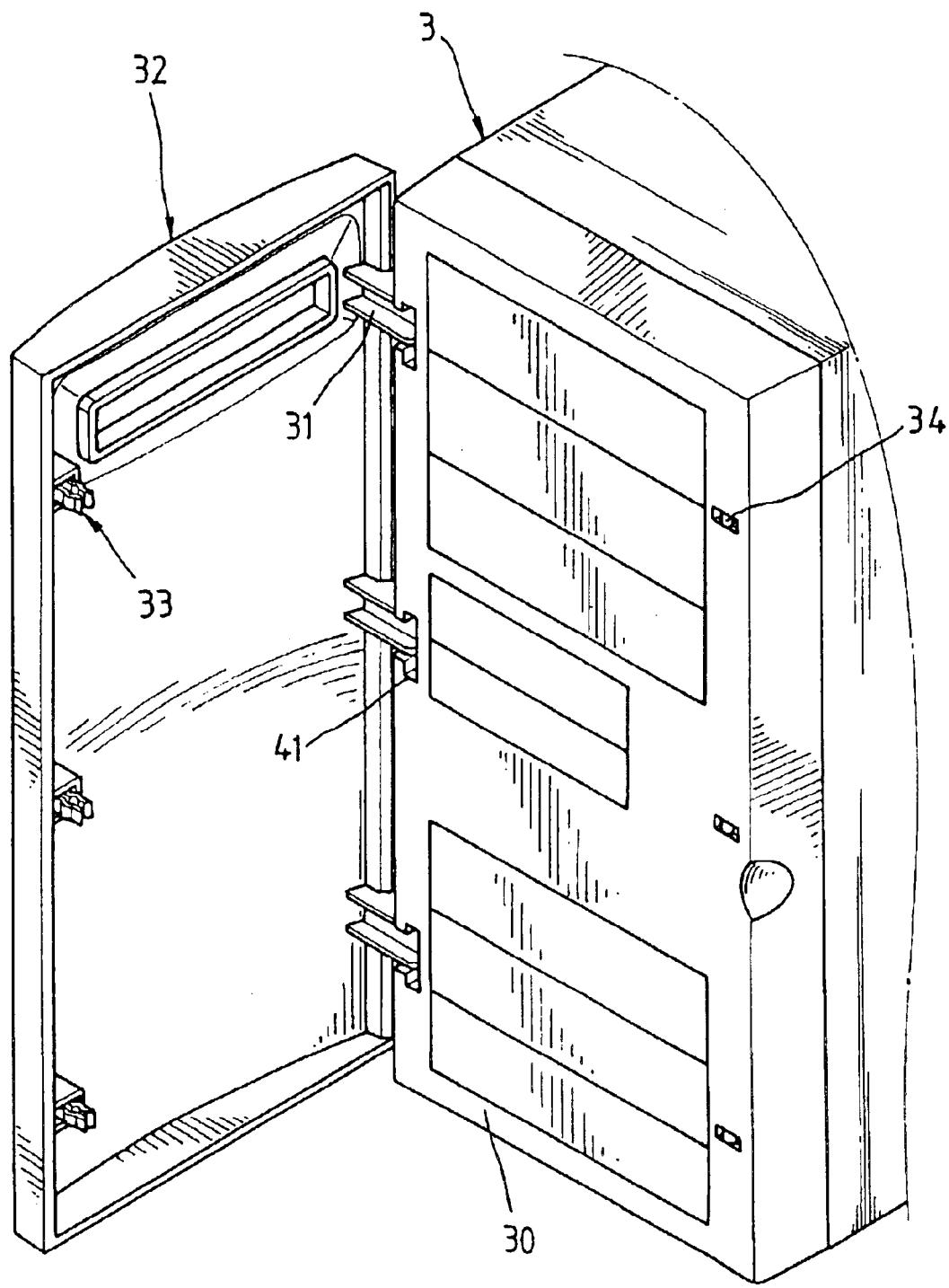
FIG. 4 is an assembly view of the computer device using a shielding door of the present invention which has been pivotally connected to a computer device.
Figure 5:
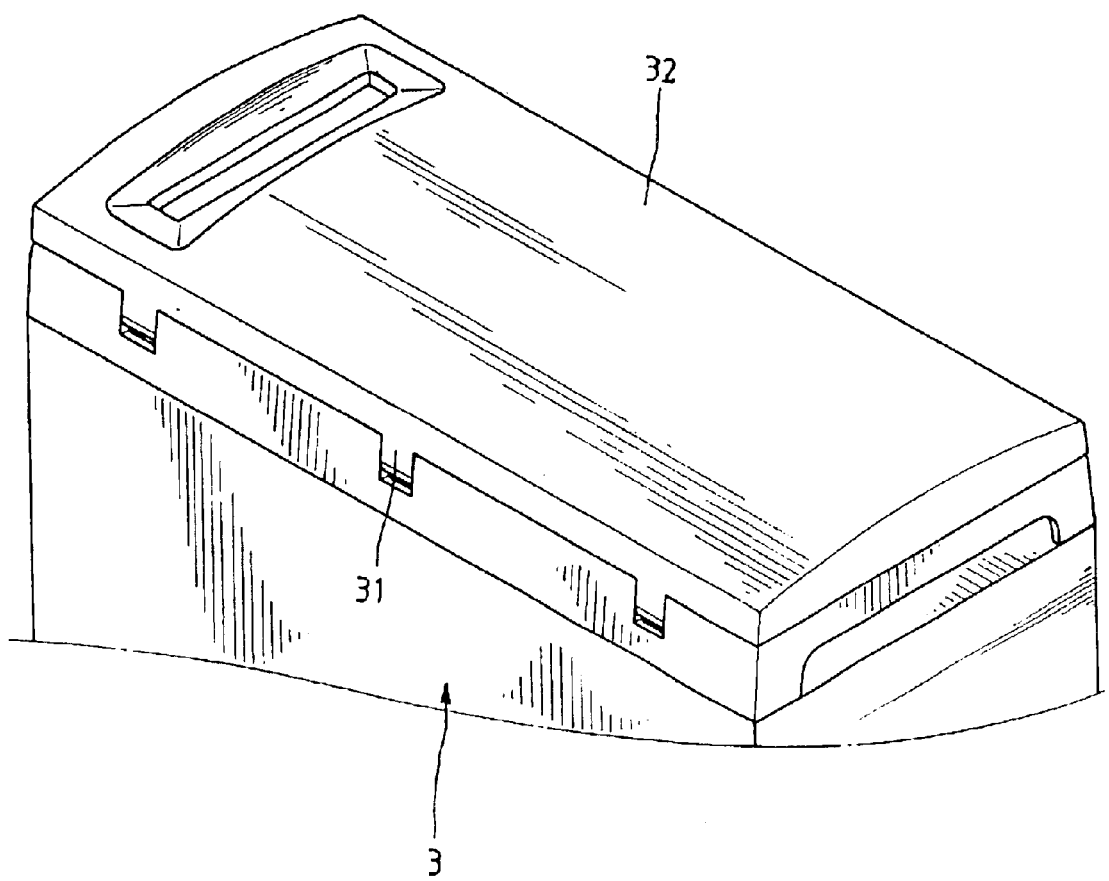
FIG. 5 shows that the shielded door of the present invention has been pivotally connected to the computer device and the door has been closed.

With reference to FIGS. 3 to 5, the structure of the present invention is illustrated.

At least one post 31 is fixed to or integral formed to a door 32. Two axial ends of the post 31 are protruded with respective shaft portions 311 and 312. The post 31 faces to the shielded surface 30 of the computer device 30. Two shaft portions 311 and 312 are pivotally installed to the pivotal portion 4 corresponding the shielded surface 30 so that the door 32 can be opened or closed as desired.

Figure 8:
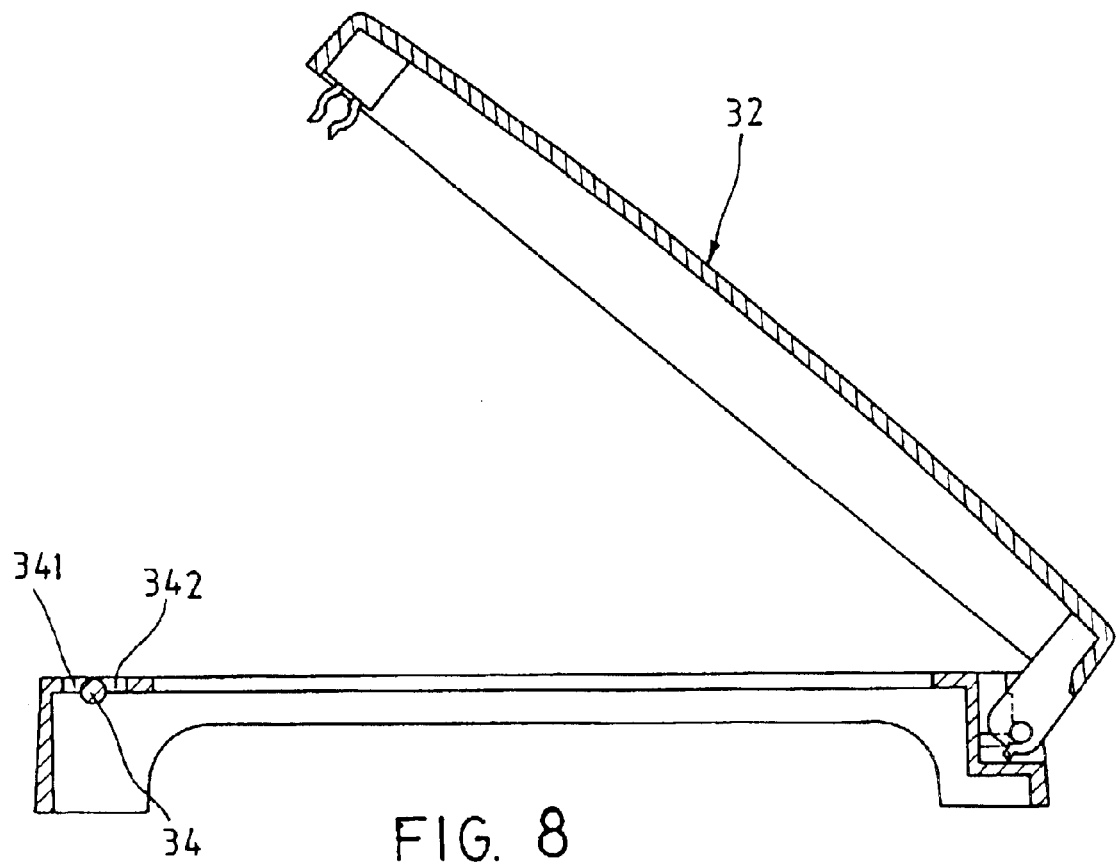
FIG. 8 is a schematic view showing that the shielding door of the present invention pivotally connected to the computer device has been opened.

The pivotal portion 4 includes at least one groove 41 for receiving the post 31 and thus the post 31 can rotate in the groove 41. The groove 41 is smaller than the shielded surface 30 and is positioned at one edge of the shielded surface 30. The groove 41 has a predetermined width and extends to an adjacent lateral side of the shielded surface 30 so that the post 31 has a sufficient space to rotate so that that the door 32 can be opened (referring to FIGS. 4 and 8). The groove 41 includes a first receiving chamber 42 and a second receiving chamber 43. The first receiving chamber 42 is slightly larger than the second receiving chamber 43 and the first receiving chamber 42 is communicated to the second receiving chamber 43. The first receiving chamber 42 can receive the post 31 including the shaft portion 311 and shaft portion 312. The second receiving chamber 43 provides a space so that other portion of the post 31 can move therein.

The first receiving chamber 42 has two lateral walls 421 and 422 which are adjacent to the shaft portion 311 and shaft portion 312. The lateral wall 421 has an opened hole 423 and the lateral wall 422 has an opened hole 424 so that the shaft portion 311 and shaft portion 312 run across the two holes 423, 424 and positioned therein (referring to FIGS. 6 to 7).

A wall 431 is connected to the lateral wall 421 of the second receiving chamber 43. An elastomer 5 has one end fixed to the wall 431 and has another free end 51. The free end 51 of the elastomer 5 is thicker for confining the shaft portion 311 after the shaft portion 311 is positioned to the hole 423. Thereby, the shaft portion 311 will not separated from the hole 423 and thus rotates therein steadily.

Figure 6:
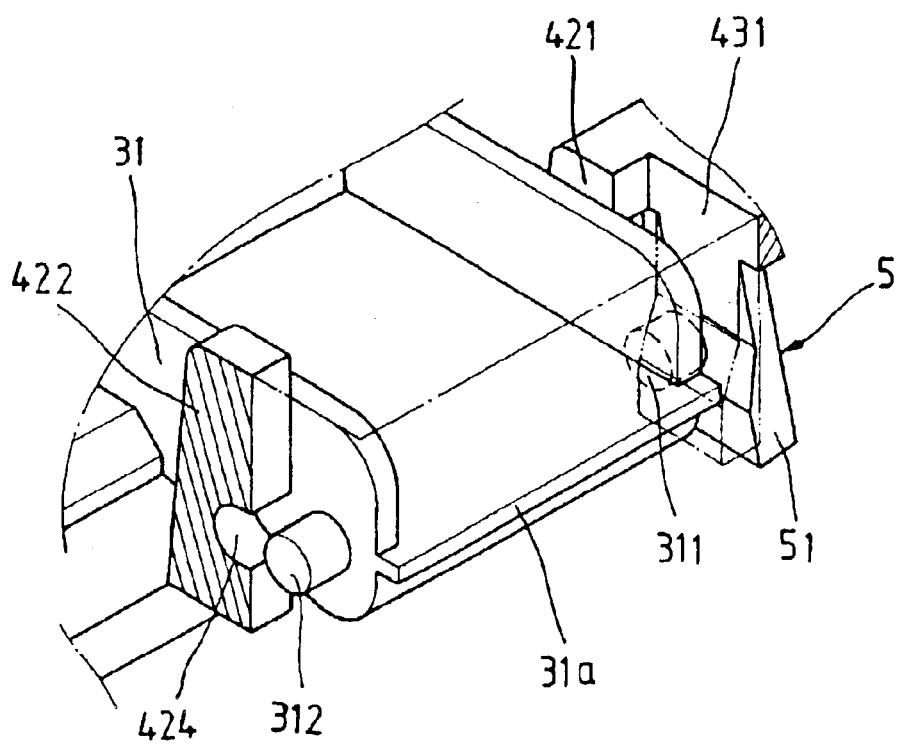
FIG. 6 is a schematic view showing the assembly of the door through the pivotal structure of the present invention.
Figure 7:
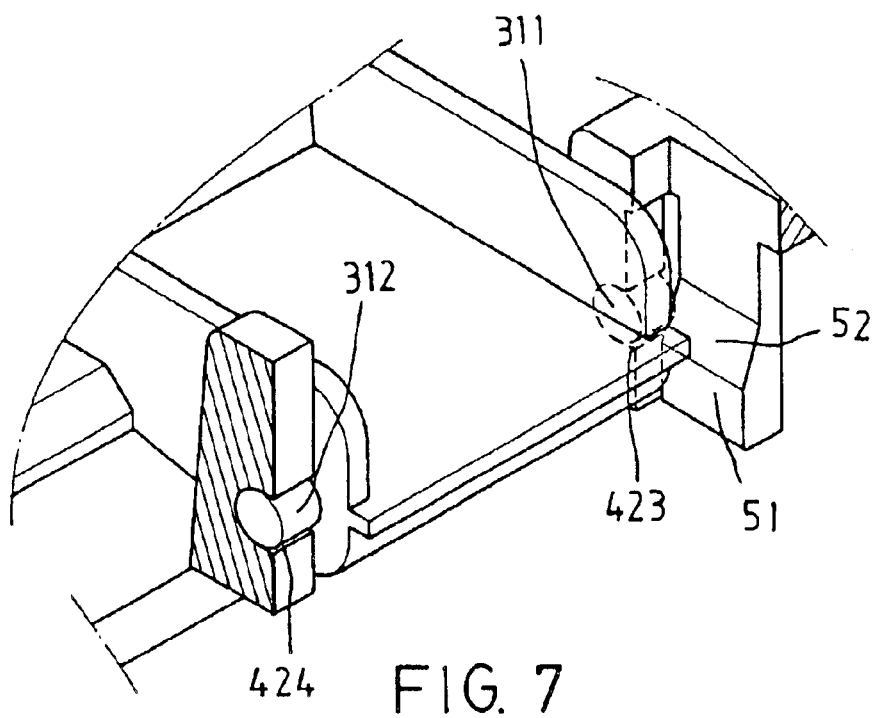
FIG. 7 is a schematic view showing that the assembly of the door through the pivotal structure of the present invention is complete.

Referring to FIGS. 6 and 7, the assembly of the present invention is illustrated. One shaft portion 311 passes through the free end 51 of the elastomer 5 so that the elastomer 5 has a deformation elastic force. After the shaft portion 311 and shaft portion 312 fill into and are positioned in the holes 423 and 424. The elastomer 5 will restore by resilient force. The free end 51 of the elastomer 5 is thicker so as to confine the shaft portion 311 (referring to FIG. 7). Thereby, the shaft portion 311 will not fall out. The free end 51 of the elastomer 5 is installed to a predetermined tilt guide surface 52. Thus, the shaft portion 311 can pass through the elastomer 5 easily.

Figure 9:
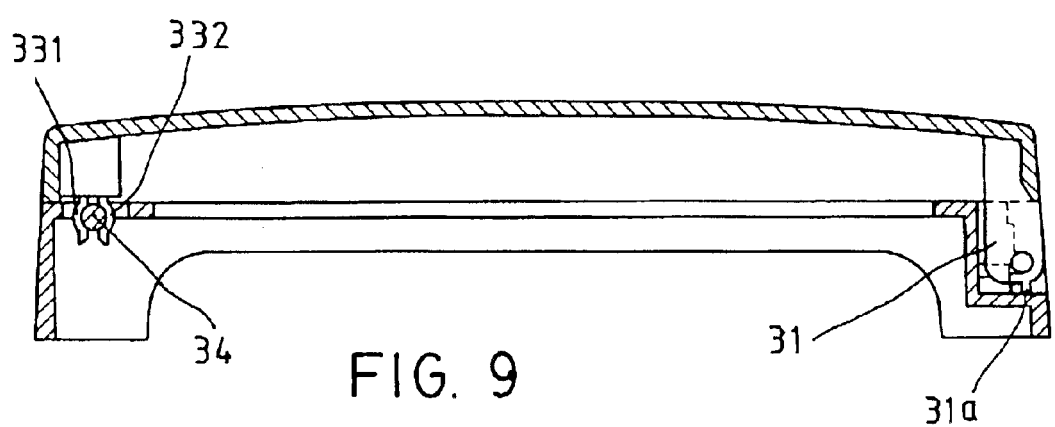
FIG. 9 is a schematic view showing that the shielding door of the present invention pivotally connected to the computer device has been closed.

In above structure, another end of the post 31 far away from the door 32 is installed with a nose 31a with a predetermined height. When the door 32 is closed, the gap between the post 31 and the shielded surface 30 can be shielded (referring to FIG. 9) for preventing undesired objects to intrude into the gap.

Besides, to cause the door 32 to be fixed to the shielded surface 30 when the door 32 is closed, a predetermined position of the door 32 is installed with at least one clamping portion 33. The shielded surface 30 is installed with at least one transversal rod 34 at position capable of being clamped by the clamping portion 33. The number of the clamping portions 33 is equal to that of the transversal rods 34. Thereby, the clamping portion 33 can clamp the transversal rod 34 for fixing the door 32. Two sides of the transversal rod 34 are hollow portions 341, 342 (referring to FIGS. 3 and 8). Thereby, two clamping pieces 331 and 332 of the clamping portion 33 can insert into the hollow portions 341 and 342 for clamping the transversal rod 34.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A computer device using a shielding door comprising:
   a door;
   at least one post fixed to the door; two axial ends of the post being protruded with respective shaft portions; the post facing to a shielded surface of the computer device;
   at least one pivotal portion capable of being pivotally engaged to the post; the pivotal portion being installed to the shielded surface; the pivotal portion including at least one groove for receiving the post and thus the post can rotate in the groove; the groove being smaller than the shielded surface and being positioned at one edge of the shielded surface; the groove having a predetermined width and extending to an adjacent lateral side of the shielded surface; the groove including a first receiving chamber and a second receiving chamber; the first receiving chamber being slightly larger than the second receiving chamber and the first receiving chamber being communicated to the second receiving chamber; the first receiving chamber receiving the post which has the two shaft portions; the second receiving chamber provides a space so that a portion of the post having no containing the shaft portions can move in the space; the first receiving chamber has two lateral walls which are adjacent to the two shaft portion and each lateral wall has a respective hole so that the two shaft portions run across the two holes and positioned therein.

2. The computer device using a shielding door as claim in claim 1, wherein a wall is connected to one lateral wall of the second receiving chamber; an elastomer has a first end fixed to the wall and have another free end which is thicker than the first end for confining the shaft portions after the shaft portions are positioned to the hole; thereby, the shaft portions will not separated from the holes and thus rotate therein steadily.

3. The computer device using a shielding door as claim in claim 1, wherein another end of the post far away from the door is installed with a nose with a predetermined height; thereby, when the door is closed, a gap between the post and the shielded surface is shielded.

4. The computer device using a shielding door as claim in claim 1, wherein a predetermined position of the door is installed with at least one clamping portion so that the door is fixed to the shielded surface when the door is closed, the shielded surface is installed with at least one transversal rod at position capable of being clamped by the clamping portion; the number of the clamping portions is equal to that of the transversal rods; thereby, the clamping portion can clamp the transversal rod for fixing the door.

5. The computer device using a shielding door as claim in claim 1, wherein the post is integrally formed on the door.

6. The computer device using a shielding door as claim in claim 2, wherein the free end of the elastomer is installed with a tilt guide surface.

* * * * *